United States Patent [19]

Gerardi et al.

[11] Patent Number: 5,206,806
[45] Date of Patent: Apr. 27, 1993

[54] SMART SKIN ICE DETECTION AND DE-ICING SYSTEM

[76] Inventors: Joseph J. Gerardi, 81 Crystal Dr., Dryden, N.Y. 13053; Philip R. Dahl, 16919 Strawberry Dr., Encino, Calif. 91436; Gail A. Hickman, 81 Crstal Dr., Dryden, N.Y. 13053

[21] Appl. No.: 295,722

[22] Filed: Jan. 10, 1989

[51] Int. Cl.$^5$ ............................................. B64D 15/20
[52] U.S. Cl. ............................ 364/424.06; 244/134 F; 340/582
[58] Field of Search ............... 73/579, 583, 658, 704; 244/134 R, 134 D, 134 F, ; 340/582, 962, 582; 364/424.06, 550

[56] References Cited

U.S. PATENT DOCUMENTS

| | | | |
|---|---|---|---|
| 2,440,198 | 4/1948 | Green | 73/147 |
| 2,541,512 | 2/1951 | Hahn | 73/170 R |
| 2,789,281 | 4/1957 | Short et al. | 340/582 |
| 2,800,647 | 7/1957 | Baerwald et al. | 340/582 |
| 3,240,054 | 3/1966 | Roth | 73/576 |
| 3,362,663 | 1/1968 | Wehlmann | 244/130 |
| 3,383,914 | 5/1968 | MacArthur | 73/147 |
| 3,969,927 | 7/1976 | Yoshida et al. | 73/658 |
| 4,461,178 | 7/1984 | Chamuel | 73/599 |
| 4,516,747 | 5/1985 | Lurz | 244/204 |
| 4,545,553 | 10/1985 | Finke et al. | 244/134 D |
| 4,553,137 | 11/1985 | Marxer et al. | 244/134 F X |
| 4,568,922 | 2/1986 | Schwippert et al. | 340/582 |
| 4,570,881 | 2/1986 | Lustenberger | 244/134 R X |
| 4,592,229 | 6/1986 | Butefisch et al. | 73/147 |
| 4,604,612 | 8/1986 | Watkins et al. | 340/582 |
| 4,611,492 | 9/1986 | Koosmann | 73/579 |
| 4,688,421 | 8/1987 | Pzsolla | |
| 4,690,353 | 9/1987 | Haslim et al. | 244/134 D |
| 4,730,485 | 3/1988 | Franklin et al. | 73/189 |
| 4,732,351 | 3/1988 | Bird | 244/134 R X |
| 4,766,369 | 8/1988 | Weinstein | 244/134 F |
| 4,775,118 | 10/1988 | Daniels | 244/134 D |
| 4,786,020 | 11/1988 | Franke et al. | 244/204 |
| 4,802,642 | 2/1989 | Mangiarotty | 244/204 X |
| 4,841,775 | 6/1989 | Ikeda et al. | 73/704 |
| 4,887,456 | 12/1989 | Cockerham et al. | 73/35 |
| 4,891,628 | 1/1990 | Zuckerman | 244/134 F |
| 4,980,673 | 12/1990 | Kleven | 340/581 |
| 5,005,015 | 4/1991 | Dehn et al. | 340/962 |

FOREIGN PATENT DOCUMENTS

| | | | |
|---|---|---|---|
| 883836 | 11/1981 | U.S.S.R. | 73/170 R |
| 1012143A | 4/1983 | U.S.S.R. | 73/189 |

OTHER PUBLICATIONS

Heyman et al. "Fiber Optic Sensor Technology-An Opportunity For Smart Aerospace Structures" IAAA-88-4665 AIAA/NASA/AFWAL Conference on Sensors & Measurement Techniques for Aeronautical Applications Sep. 7, 1988-Sep. 9, 1988.

(List continued on next page.)

*Primary Examiner*—Edward R. Cosimano
*Attorney, Agent, or Firm*—Pennie & Edmonds

[57] ABSTRACT

The de-icing system of the present invention comprises a piezoelectric sensor means and a processor means. A piezoelectric film is the preferred sensor means and a microprocessor is the preferred processor means. In a preferred embodiment, a strip of piezoelectric film placed at a point of model kinetic energy such as the boundary layer transition point or the vortex generator of the aircraft. Such placement of the strip provides adequate airflow to excite the piezoelectric film without using a power source, thus providing a passive system. The sensor allows measurement of distributed strain and vibrational modes indicative of structural icing. The microprocessor, which controls the system, processes signals from the sensors, determines whether ice is present, and indicates the presence of ice when appropriate. The film may be used in a single piece, which may be as large as the area for which ice detection is desired—for example, the entire leading edge of an aircraft wing—or in multiple pieces, and may be embedded in or attached to a surface. This provides a passive, autonomous system for distributed ice detection over a single sensor or between multiple sensors.

12 Claims, 13 Drawing Sheets

OTHER PUBLICATIONS

Olsson et al., "Assessment of the Piezo-Electric Foil as a Mean of Monitoring the Wall Turbulence", *The Aeronautical Research Institute of Sweden (FFA), Stockholm*, Document No. FFATN 1985-60, 1985, pp. 1-30.

Bertelrud, "Use of Hot film Sensors and Piezoelectric Foil for Measurement of Local Skin Friction", *The 12th International Congress on Instrumentation in Aerospace Simulation Facilities (ICIASF)*, Williamsburg, Va., Jun. 22-25, 1987, pp. 1-5 (FIGS. 1-22).

Scott, "New Stall Detection System Measures Intensity of Turbulent Airflow Over Wing", *Aviation Week & Space Technology*, Jan. 11, 1988, pp. 57-59.

Scott, "Air Force Funding Joint Studies to Develop 'Smart Skin' Avionics", *Aviation Week & Space Technology*, Apr. 18, 1988, p. 65.

Wusk et al., "An Arrayed Hot-Film Sensor for Detection of Laminar Boundary-Layer Flow Disturbance Spatial Characteristics", *AIAA/NASA/AFWAL Sensors & Measurement* Technologies Conference, Atlanta, Ga., Sep. 1-9, 1988, pp. 1-11.

Regowski et al. "The Evolution of 'Smart' Composite Material", *NASA Tech. Briefs*, Oct., 1988, pp. 20-22.

Goldberg and Lardiere, Jr., "Developments in Expulsive Separation Ice Protection Blankets", *AIAA, 27TH Aerospace Sciences Meeting*, Reno, Nev., Jan. 9-12, 1989, pp. 1-5.

Eric H. Urruti and John F. Wahl "Coatings Affect Fiber Performance in Smart-Skin Sensing", *Laser Focus World*, Jan. 1990, pp. 165-170.

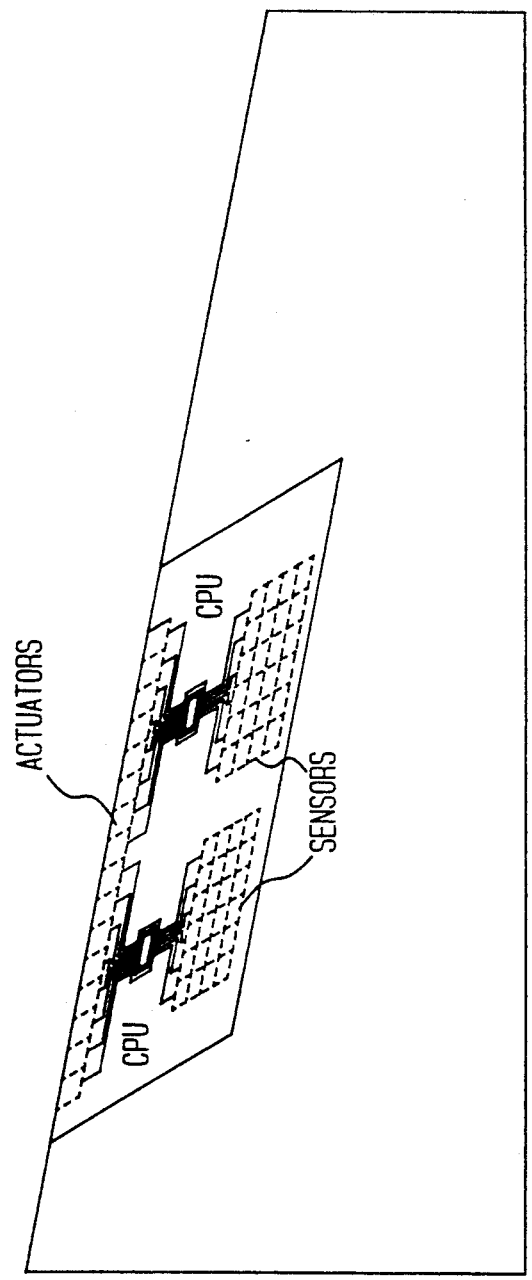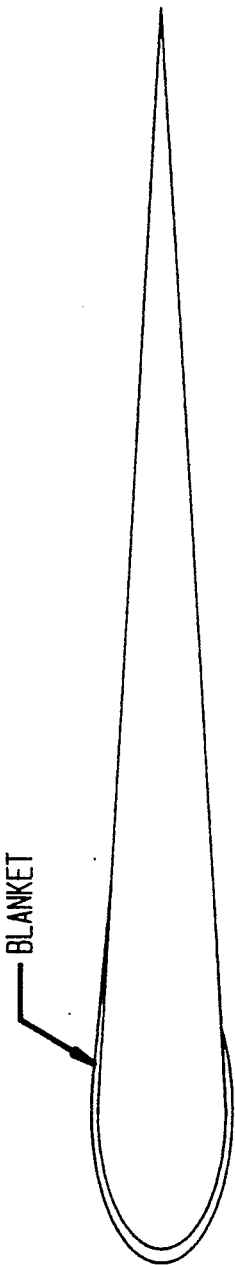

MODE #2 - NO ICE (333.60 Hz)

MODE #2 - NO ICE (333.60 Hz)

MODE #2 - 1/4" ICE (385.75 Hz)

MODE #2 - 1/4" ICE (385.75 Hz)

MODE #2 - 1" ICE (486.42 Hz)

MODE #2 - 1" ICE (486.42 Hz)

SMART SKIN ICE DETECTION AND DE-ICING SYSTEM

STATEMENT REGARDING FEDERALLY SPONSORED RESEARCH

This invention was made with Government support under Contract No. DAAH01-87-C-0860 awarded by the Defense Advanced Research Agency (DoD), Defense Small Business Innovation Research Program. The Government has certain rights in this invention.

BACKGROUND OF THE INVENTION

This invention relates to ice detection and de-icing systems, and more particularly to ice detection and de-icing systems for use on the leading edge of an aircraft wing.

Ice accretion, or buildup, on the surface of aircraft can have deleterious effects on flight performance. Lift decreases, thrust falls off, drag and weight increase, and the stall speed rises sharply. Indeed, sometimes the effects are serious enough to cause a crash. A reliable ice detection system is thus required to detect the onset of ice accretion. Such a system allows either for changing the flight path of the aircraft and getting it out of the icing environment, or for activating a de-icing system to remove the ice and enabling the aircraft to continue on a desired course.

Recently developed technology has made some advances from such imprecise methods as relying on weather forecasts, ambient temperature readings, and visual cloud sightings.

The ice detection system disclosed by Daniels in U.S. Pat. No. 4,775,118 uses an Electro-Impulse De-Icing (EIDI) coil to induce eddy currents in an aircraft surface skin. An accelerometer senses vibrations in the skin. The presence of ice changes the manner in which the skin responds to the electromagnetic forces imparted by the coil. Thus the accelerometer can sense the presence of ice.

The ice detection system disclosed by Daniels has certain limitations and disadvantages. First, the accelerometer is a point sensor, as opposed to a distributed sensor system, in which the sensor can monitor a large area. Second, the accelerometer is too large to be embedded in a skin or surface, and therefore it must be attached to the skin. Third, as a power source is required to pulse the EIDI coil, Daniels's system is necessarily active, not passive. Fourth, the Daniels system is not a self-contained one, which can be easily maintained or replaced if necessary. A self-controlled system, especially a passive one, would be well suited to retrofitting existing aircraft. And fifth, the point sensing technique disclosed by Daniels is prone to misinterpretation under certain icing conditions. Specifically, an increase in mass on the surface will decrease the frequency of the surface vibrations, while an increase in surface stiffness will increase the frequency. If the increase and the decrease cancel one another, the icing condition will not be detected properly with the teachings of Daniels.

Daniels also incorporates a method for removing ice by pulsing the surface with the EIDI coil at a higher voltage than for producing surface waves for ice detection. That method was known in the art.

In U.S. Pat. No. 4,732,351, Bird discloses an ice detection system using a piezoelectric material to cover a surface. While this is a distributed system, Bird does not teach a nonintrusive embedding of the piezoelectric material, an autonomous system, or a passive one. Bird teaches removing ice by inducing waves in the piezoelectric covering material.

One ice removal system which has proven effective is described by Haslim et al. in U.S. Pat. No. 4,690,353. Goldberg et al. purport to teach improvements of that patent in "Developments in Expulsive Separation Ice Protection Blankets". These references describe an electro-expulsive separation system in which an elastomeric covering referred to as a blanket, cuff, or boot is placed on an aircraft surface. Mutually repelling conductors are employed to distend the blanket abruptly, thus propelling ice off the protected surface. It would be desirable to combine this ice removal system with an effective ice detection system such that the entire system is autonomous, minimally intrusive, and easily retrofittable.

One concept of "smart structures" or "smart skins", in which sensors, actuators, and microprocessors are integrated, has been disclosed by Heyman et al. in "Fiber Optic Sensor Technology—An Opportunity for Smart Aerospace Structures", AIAA-88-4665 (AIAA/NASA/AFWAL Conference on Sensors and Measurements Techniques for Aeronautical Applications, Sep. 7-9, 1988). Heyman et al. disclose using fiber optics as sensors. Disadvantages of using fiber optics include not being easily retrofittable and not working well in elastomers due to fiber stiffness.

SUMMARY OF THE INVENTION

The de-icing system of the present invention comprises a piezoelectric sensor array means and a processor means. A piezoelectric film is the preferred sensor means and a microprocessor is the preferred processor means. The processor includes the capability of processing Fast Fourier Transforms (FFTs) of signals generated by the sensor array means. The processor further has the capability of receiving signals from one or more sensors of the environmental parameters of temperature, humidity, and relative humidity. The processor compares the signals from the environmental parameter sensor or sensors, and data from the FFTs, with stored data corresponding to structural characteristics under various circumstances. This stored data may take the form of data tables or and equation representing such tables.

In a preferred embodiment, a strip of piezoelectric film attached to the structure at a point of high modal kinetic energy such as the boundary layer transition point or the vortex generator of the aircraft. Such placement of the strip provides adequate airflow to excite the structure without using a power source, thus providing a passive system. The sensor allows measurement of distributed strain and vibrational modes indicative of structural icing. The microprocessor, which controls the system, processes signals from the sensors, determines whether ice is present, and indicates the presence of ice when appropriate. The film may be used in a single piece, which may be as large as the area for which ice detection is desired—for example, the entire leading edge of an aircraft wing—or in multiple pieces, and may be embedded in or attached to a surface. This provides a passive, autonomous system for distributed ice detection over a single sensor or between multiple sensors.

The piezoelectric film allows for a smart skin system without the disadvantages inherent in using fiber optics.

This method allows for ice detection over large areas with minimal hardware, thus reducing total weight and cost. Film sensors can be bonded inside the leading edge skin without cutting or drilling the surface, thereby extending wing fatigue life. Simple installation requirements make it ideal for retrofitting on aircraft.

In another embodiment of the invention, an EIDI coil and low level impulse source provide excitation for a single strip of piezoelectric film. The strip thus no longer requires excitation by the airflow and need not be particularly located. A microprocessor processes sensor signals as in the previous embodiment. Ice removal may be accomplished with the EIDI coil by providing a high level pulse to the EIDI coil, as known in the art.

In still another embodiment of the invention, the piezoelectric sensor film is embedded in the elastomer of an electro-expulsive blanket. A microprocessor controller pulses the blanket to excite the dominant structural modal frequencies. The sensors generate signals which are then processed by the microprocessor as described above. When the microprocessor detects the presence of ice, it activates the blanket to expel the ice. A capacitor used as a power source and a silicon controlled rectifier (SCR) switch can also be integrated in the blanket, providing an autonomous ice detection and removal system which can be easily retrofitted on existing aircraft.

In yet another embodiment of the invention, the ice detection system using piezoelectric film as described is combined with Lead Zirconate-Titanate (PZT) actuator crystals for removing ice by imparting vibration to the surface.

BRIEF DESCRIPTION OF THE DRAWINGS

FIGS. 12a and 12b depict another embodiment according to the present invention.

FIG. 8 is a block diagram of an experimental setup.

DETAILED DESCRIPTION

General Theory of Operation of Smart Skin Ice Detector

Embedded or attached thin polymer film sensors allow the measurement of distributed strain and vibrational modes indicative of structural icing. Sensor excitation may be provided by a low level impulse source such as an Electro-Impulse De-Icing eddy coil for an active system, or by sufficient airflow over the sensor for a passive system. Based on the shift in resonant frequencies, the presence of ice can be determined.

The sensor consists of extremely sensitive piezoelectric transducers. These transducers may be bonded, for example, to the inside of the airfoil skin. A strip of piezoelectric film is placed at a point of model kinetic energy such as the boundary layer transition point or the vortex generator of the aircraft. Such placement of the strip provides adequate airflow to excite the piezoelectric film without using a power source, thus providing a passive system. Alternatively, a low level EIDI coil may be used to excite the natural modes of the leading edge structure, thus providing an active system. The sensor output signal is proportional to the surface deformation, which is a function of the surface stiffness, damping, the amount and type of ice, and the ice distribution. A microprocessor samples the sensor signals and determines the presence of ice using spectral analysis techniques. The microprocessor comprises the capability of processing the Fast Fourier Transforms (FFTs) of a first set of at least one sensor array means and of a second set of at least one sensor array means and dividing the FFT of the first set by the FFT of the second set to obtain a transfer function, wherein the first set is disposed more upstream to air flow than the second set. The desired mode shape required to sense the ice accretion is obtained by proper design of a single sensor or proper geometrical spacing of multiple sensors, which will be apparent to those of skill in the art.

The preferred piezoelectric polymer film that is the active element of the sensor is polyvinylidene fluoride (PVDF). Such film is manufactured, for example, by Pennwalt Corporation under the trademark Kynar. Piezoelectric behavior is induced by poling, a polarization treatment which aligns the polar axes of the individual crystallites. PVDF film is particularly well suited to the high G environment created by vibrations of the EIDI coil, and thus may be placed in close proximity to the coil if it is used.

Figure 1:
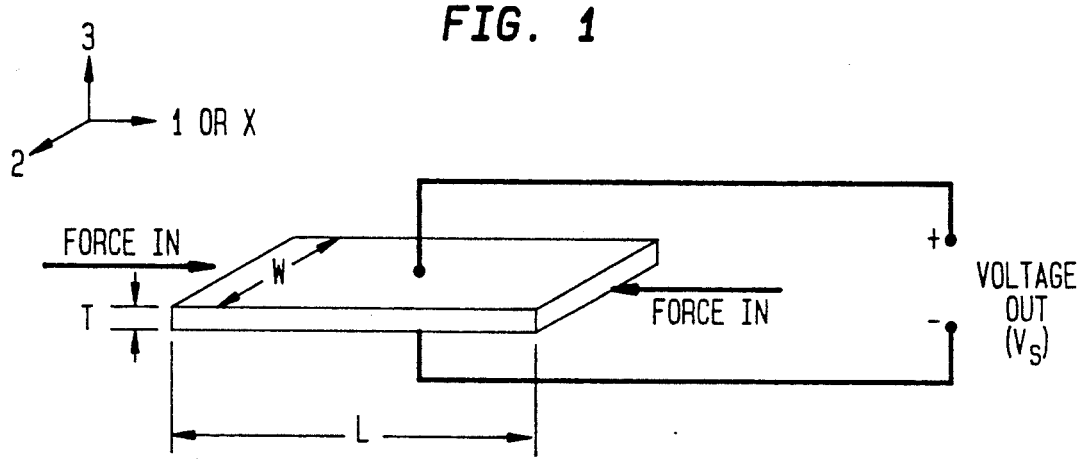
FIG. 1 depicts a polyvinylidene fluoride (PVDF) sensor according to the present invention.

FIG. 1 depicts a PVDF sensor used in accord with the present invention. For uniaxially polarized PVDF, a strain in the x-direction caused by surface deformation of the leading edge produces a change in the surface charge density of the material so that a voltage develops between the electrodes. A reciprocating strain will result in an alternating output voltage. This voltage can then be processed for desired real time frequency domain analysis.

The piezoelectric effect of PVDF is extremely stable. Its poled internal structure remains stable under all but the most extreme conditions of temperature, mechanical shock, or externally applied voltage. It requires a temperature over 120° C., an impact of several millions G's, or several thousand volts in order to depole the activated film.

A matrix equation that describes the piezoelectric material is:

$$[D] = [e][S] + [\epsilon^S][E] \tag{1}$$

where [D] is the electric displacement vector, [e] is the piezoelectric constant strain coefficient matrix, [S] is the strain vector, [$\epsilon^S$] is the piezoelectric dielectric constant coefficient matrix under constant strain, and [E] is the applied electric field vector. For the PVDF segment shown in FIG. 1, with displacement x or strain $S_1$ being produced in the 1-direction, and with an electric field $V_3/t$ applied across the PVDF film 1,2 surface plate electrodes in the 3-direction, a charge density, $q_3/WL$, is produced on the plates according to:

$$q_3 = WLe_{31}S_1 + \frac{WL\epsilon_{33}^S}{t} V_3 \tag{2}$$

where WL is the area and t is the thickness.

When used as a sensor, the PVDF has zero volts applied and so the second term in equation 2 is set to zero. When the airfoil surface is bending, the PVDF sensor strip that is epoxied to the surface undergoes a strain in the x-direction. The charge density on the plates is theoretically nonuniform; however, the metallized layer on the PVDF film surface has the effect of averaging the potential on the surfaces. The voltage, $V_s$, on these strips is:

$$V_s = \frac{1}{C} q_3 \tag{3}$$

where C is the PVDF macro capacitance electrical impedance of the segment, and where $\bar{q}_3$ now is the average charge produced by the average strain over the length of the PVDF segment. The charge input to the PVDF capacitance load impedance becomes:

$$\bar{q}_3 = WLe_{31}\bar{S}_1 \tag{4}$$

where:

$$\bar{S}_1 = 1/L \int_0^L S_1(x)dx \tag{5}$$

Figure 2:
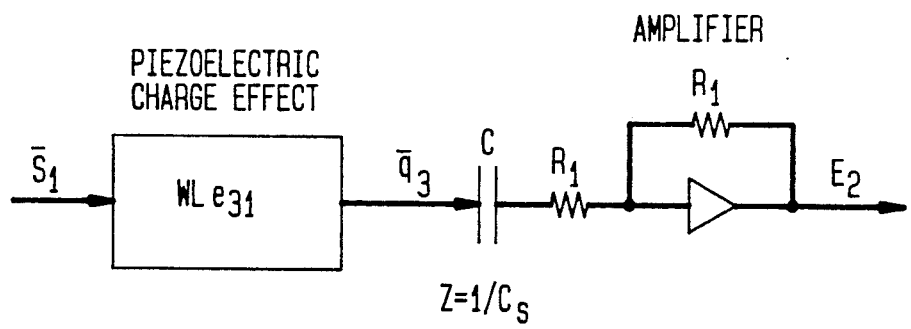
FIG. 2 depicts a model block diagram for a PVDF sensor as used in the present invention.

The piezoelectric charging of the capacitance owing to PVDF strain is shown in the resulting sensor model block diagram in FIG. 2. The impedance to the amplifier shown in that figure is seen to be:

$$Z_1 = \frac{1}{Cs} + R_i \tag{6}$$

and so the transfer function of this amplifier is:

$$\frac{E_0}{V_s} = \frac{R_f Cs}{(R_i Cs + 1)} \tag{7}$$

Substituting equations 3 and 4 into equation 7 yields the desired result:

$$\frac{E_0}{\bar{S}_1} = WLe_{31} \frac{R_f s}{(R_i Cs + 1)} \tag{8}$$

The output amplitude increases approximately proportional to frequency up to the break frequency $f_b = (2\pi RC)^{-1}$. Practical values of this break frequency are as low as a few hertz, which serves the purposes of the ice sensor very well since the mode frequencies of interest in aircraft wing leading edges are well above this range. Above this frequency the signal is proportional to strain. The amplitude ratio or gain of the sensor is:

$$\left| \frac{E_0}{\bar{S}_1} (jw) \right|_{W \to \infty} = \frac{WLe_{31}R_f}{R_i C} \tag{9}$$

As an example to show the sensitivity of the PVDF sensor, assume $e_{31} = 69 \times 10^{-3}$ coulombs/m$^{2'}$, $R_f = 1$ M ohm and $R_i = 10$ M ohm. For a 10 cm$^2$ film with a thickness of 28 $\mu$m, the capacitance is $3.1 \times 10^{-9}$ farads which yields a gain of 22 volts/% strain and a break frequency of 5 Hz.

Figure 3:
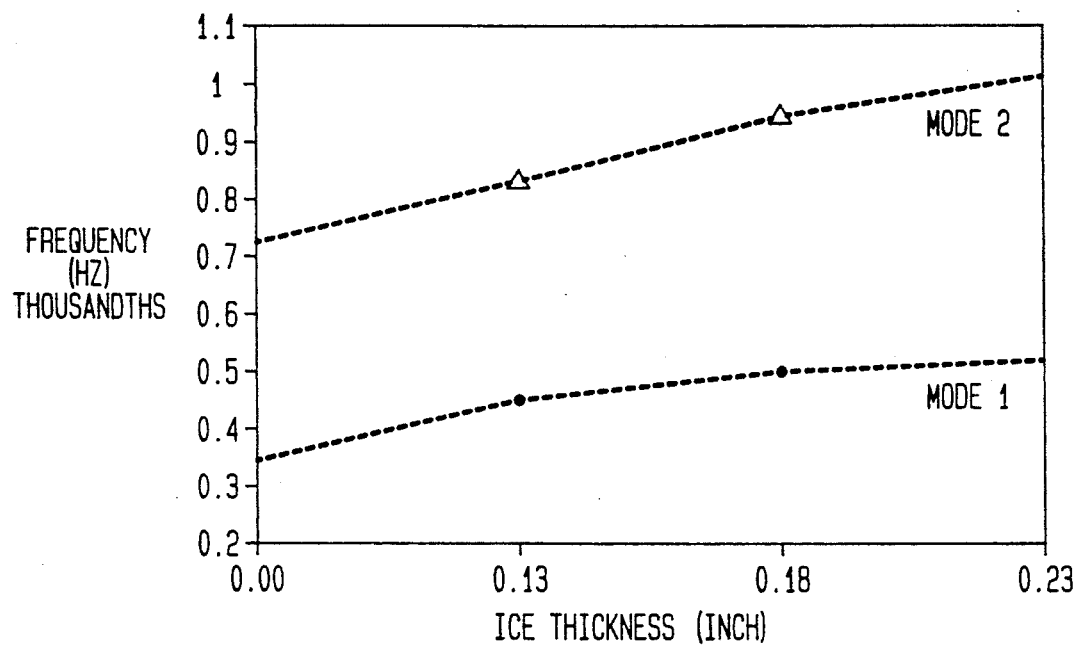
FIG. 3 is a plot of frequency versus ice thickness for a DHC-6 wing, which indicates an upward shift in modal frequencies as a function of ice accretion.
Figure 4:
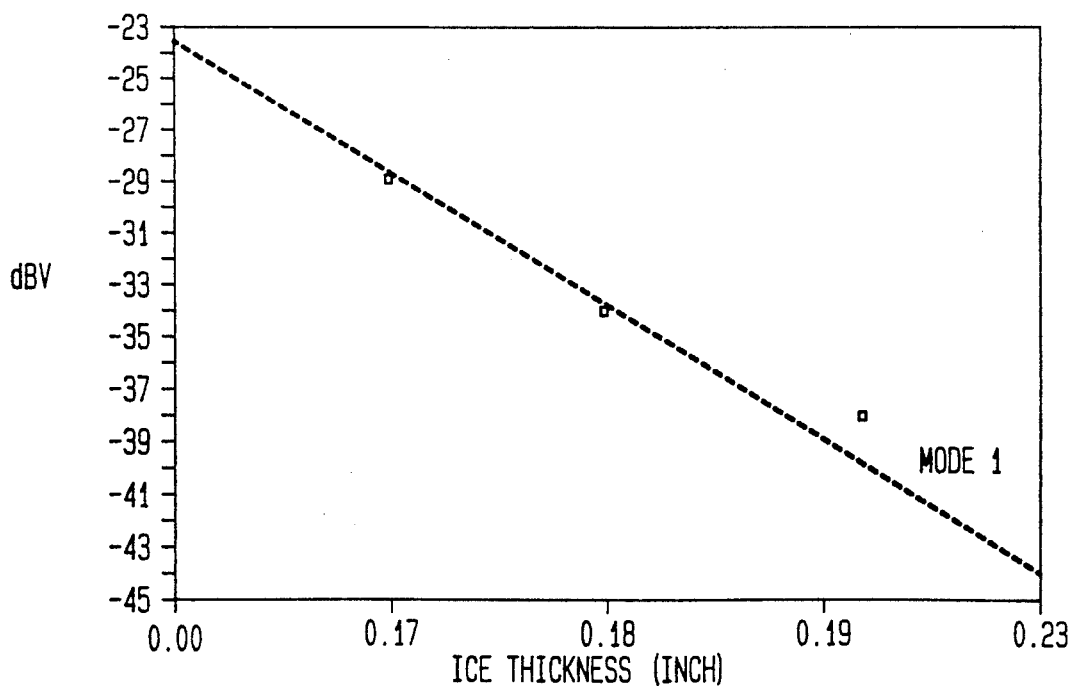
FIG. 4 is a plot if the total RMS voltage level of the sensor versus ice thickness for the DHC-6, which indicates a linear decrease in measured dBV with ice thickness.

The sensor's output may be analyzed using either of two techniques: 1) power spectral density to track the frequency shift, or 2) total RMS voltage level to determine the change in surface deflection and strain owing to ice accretion. Both methods have proven to be effective. FIG. 3 is a plot of frequency versus ice thickness for a DHC-6 wing which shows that the two dominant modes, 325 Hz and 725 Hz, shift with ice thickness. The results indicate an upward shift in modal frequencies as a function of ice accretion. FIG. 4 shows the total RMS voltage level of the sensor versus ice thickness. The data indicate the onset of icing with a decrease in sensor voltage. The ice tends to stiffen the structure, reducing the surface deflection and strain occurring under the ice buildup. As a result, the sensor voltage drops by 20 dBV ¼ inch ice accretion.

For effective ice detection, a good understanding of the structural mode shapes and frequencies as a function of ice accretion is required for proper placement of the sensors. A finite element analysis of a section of the leading edge of the NASA Icing Research Aircraft, a DeHavilland DHC-6, was performed for comparison with experimental and future flight tests. The model was 12.5 inches in length (spanwise) with an inside radius of 2.5 inches. A surface mount eddy coil was located at the mid-length of the stagnation line. The ice was centered 1.5 inches above and below the stagnation line as shown in FIGS. 13a, 13b, 14a, 14b and 15b.

The normal modes vibration analysis was conducted using the DORAC finite element program on the IBM 3081 mainframe computer to extract the resonant frequencies and corresponding mode shapes. The leading edge was modeled using 255 isoparametric quadrilateral plate elements while the ice was modeled using eight node solid elements. The coil and doubler were modeled using quadrilateral plate elements while the connection between the coil and leading edge and the connection between the doubler and leading edge was modeled as a stiff rubber using simple bar elements. The two ounces of coil weight was evenly distributed over the four grid points at the center of the coil mounting. The boundary conditions chosen were pinned on all edges. The selected geometric and physical parameters for the study are summarized in Table 1.

The first four frequencies were extracted for ice thicknesses ranging from zero to 1 inch and are listed in Table 2. FIGS. 13a, 13b, 14a, 14b, 15a and 15b are typical mode shape plot showing mode #2. As can be seen, the primary effect of adding ice was to stiffen the shell and thus raise the vibratory frequencies. Mode #2 was influenced most significantly, increasing from 333.6 Hz 486.4 Hz. With proper sizing and mounting requirements, a sensor could be designed to enhance the detection of this mode. An experiment was devised to test this concept and is discussed below.

Figure 18:
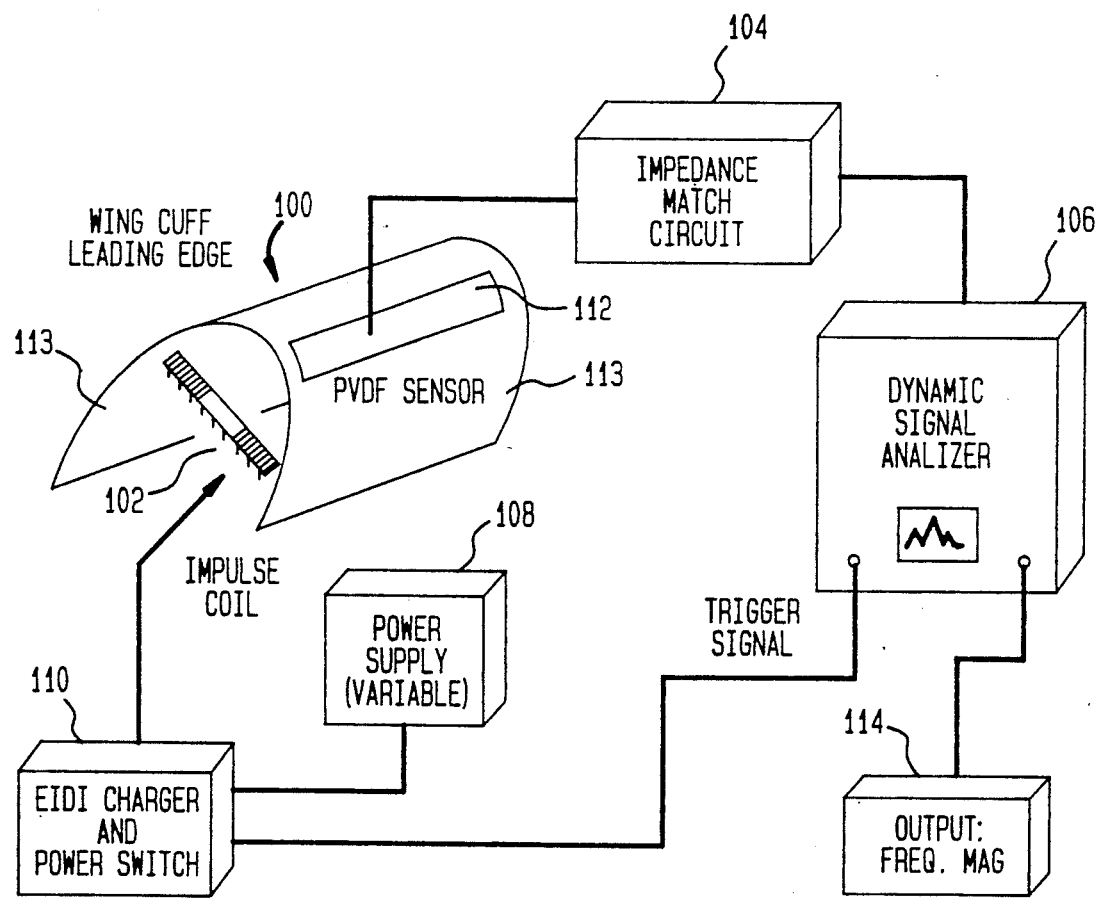

Experimental studies were carried out to determine the ability of the PVDF sensor to determine ice accretion. A block diagram of the experimental setup is shown in FIG. 18. The experimental setup comprises a wing cuff leading edge 100, a PVDF sensor 112, an impedance match circuit 104, a dynamic signal analyzer 106, a variable power supply 108, an EIDI charger and power switch 110, a monitor impulse coil 102 and output frequency and magnitude monitor 114. A replica of the analytical leading edge was fabricated from 0.032 inch thick 2024 aluminum. The boundaries were rigidly bolted to a support aircraft structure.

A single spar-mounted eddy coil 102 located mid-length on the stagnation line provided the sensor excitation source. The basic circuit is known in the art. Energy is discharged through the coil 102 by a remote signal to a silicon-controlledrectifier 110 (power switch). Discharge of the capacitor through the coils 102 creates a rapidly forming and collapsing electromagnetic field which induces eddy currents in the metal skin 102. The fields of the currents in the coil 102 and skin 113 create a repulsive force. The coil 102 was pulsed with 150 volts at a frequency of 0.5 Hz.

The modal frequencies and shapes generated by the eddy coil impulse were determined by measuring the surface deflection with a proximitor at various points on the test model. The proximitor has a usable frequency range from 1 to 1500 Hz and a sensitivity of 0.25 volts per millimeter. Based on the results of the modal survey, the size and placement of the sensor 112 was chosen to enhance detection of the lower order dominant modal frequencies. The sensor 112 used in the study was a single strip of 0.28 μm thick Kynar PVDF film, 12.5 inches in length and 1 inch wide. It was bonded to the surface of the test model, spanwise along the stagnation line, under the location of the ice building up. The signal was fed into an impedance match circuit 104 and then into the dynamic signal analyzer 106. Because the signal to noise ration in the lab environment was greater than 50, no amplification was required.

The ice sensing tests were performed in a low temperature ($-20°$ F.) ice chamber. Ice accretions ranging from 1/16 to ¼ inch in thickness were tested. The ice shape resembled the ice configuration used in the analytical model.

FIGS. 16a, 16b, 17a and 17b show the frequency spectrum of vibration of the leading edge obtained with the PVDF sensor for no ice and for ¼ inch ice, respectively. The two dominant modes, 325 Hz and 725 Hz, shift with ice thickness as plotted in FIG. 3. Although the measured and analytical frequencies do not agree due to differences between the experimental and analytical models (i.e. EIDI coil mount and ice properties), both results indicate an upward shift in modal frequencies as a function of ice accretion.

The microprocessor must receive signals generated by sensors of one or more of the environmental parameters of temperature, humidity, and relative humidity. The microprocessor then compares the data from the signals generated by the PVDF sensor array and the environmental sensor or sensors and compares this with stored data or characteristics of frequency and total RMS voltage as a function of ice thickness (ice load). Different characteristics for different aircraft and different environmental parameters is stored either as numeric data tables or as an equation which represents the data tables. The data tables and equation may be derived by those of skill in the art by analysis of plots representative plots corresponding to FIGS. 3, 4, 16a, 16b, 17a and 17b which represent various spectral ice signatures for various ice thickness and densities.

Preferred Embodiments

One preferred embodiment of the present invention is a passive smart skin ice detection system essentially as described above.

Another preferred embodiment is an active smart skin ice detection system essentially as described above.

Figure 5:
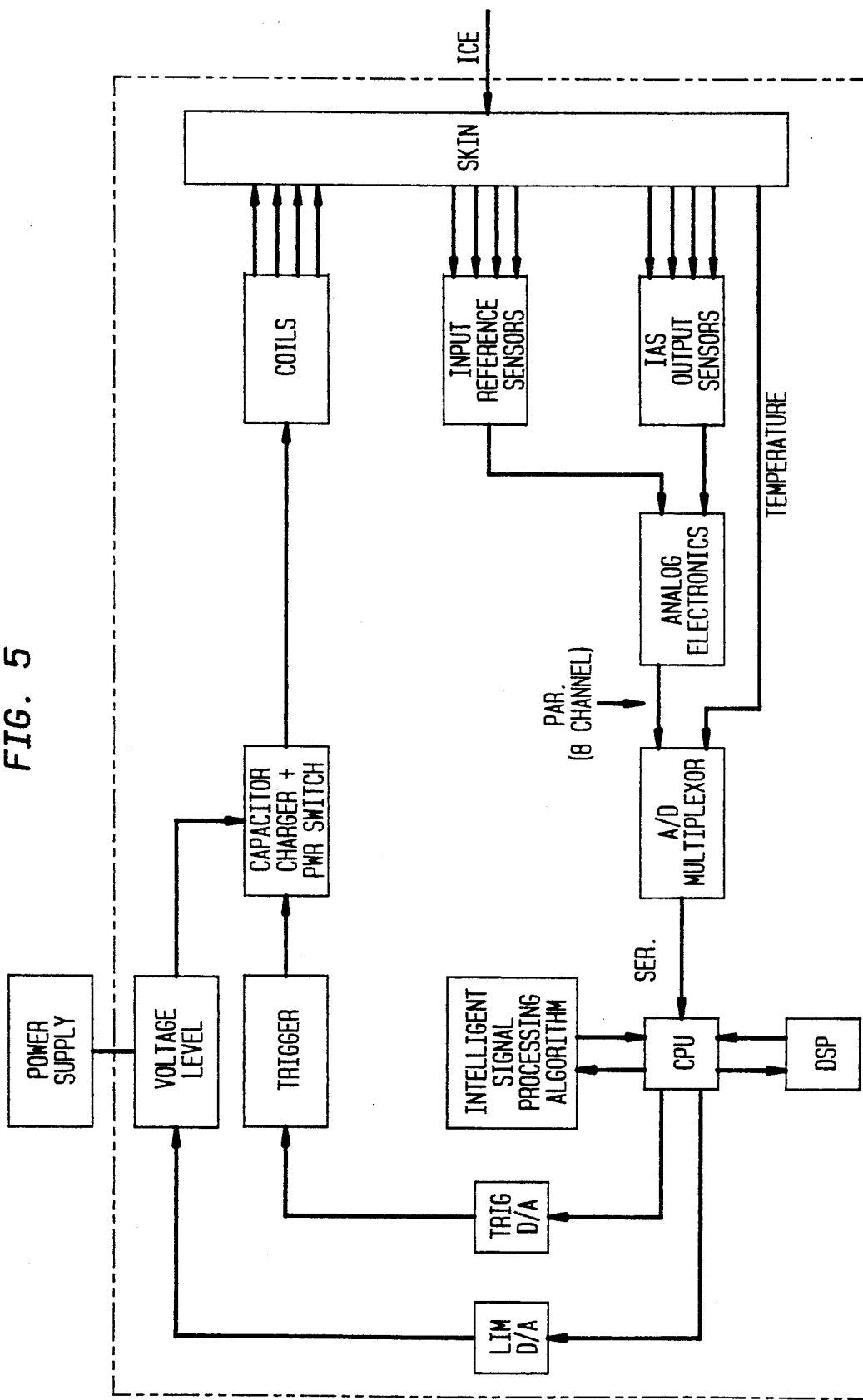
FIG. 5 depicts a block diagram of another preferred embodiment, which combines the ice detection system of the present invention with an electro-expulsive blanket or an Electro-Impulse De-Icing (EIDI) coil for ice removal.

Another preferred embodiment combines the ice detection system of the present invention with an EIDI coil for ice removal. A block diagram of such a system is shown in FIG. 5. The system design consists of a top down (centralized) approach using a single microprocessor (CPU) 32 and a single power distribution box. Input reference sensors 6 and Ice Accretion Sensor (IAS) output sensors 8 are connected to a blanket and send signals to analog electronics 10. An A/D multiplexor 12 receives signals from the analog electronics 10 and a temperature sensor that is connected to the blanket. The A/D multiplexor 12 sends signals to a microprocessor central processing unit (CPU) 32. The CPU 32 can send and receive signals to and from an IAS Data Bank 14 and a Display (DSP) 16. The CPU 32 can also provide signals to a limit D/A converter 18 and a trigger D/A converter 20. The limit D/A converter 18 provides a signal to a variable current limiter 22 powered by a power supply 4 which preferably supplies 1500 V. The trigger D/A converter 20 provides a signal to a trigger 24. The variable current limiter 22 and the trigger 24 provide signals to an EIDI charger and power switch 26, which in turn provides signals to EIDI coils 28 that are connected to provide excitation to a blanket.

The EIDI coils 28 excite the leading edge sensors with a low level impulse (typically 50 V). The sensor pairs are sampled and a transfer function is computed and digitally filtered for the desired frequency band. Ice thickness is determined by the frequency and magnitude. If more than one bay is diagnosed with ice, a command is sent to increase the voltage level to 500 V or higher and to begin a de-icing sequence. A variation of this embodiment is a closed loop low level impulsing scheme that would determine ice thickness based on total RMS power over a defined frequency band.

Still another preferred embodiment of the present invention combines the smart skin ice detection system described above with an electro-expulsive blanket ice removal system. The PVDF sensors may be embedded in the elastomer of the blanket or attached to the surface of the blanket.

Figure 6A:
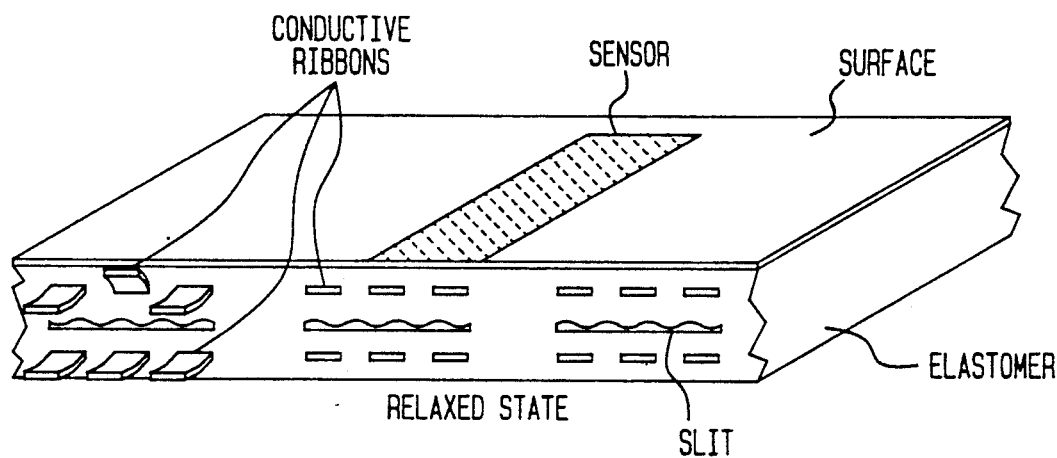
FIG. 6a depicts a sensor system integrated with an electro-expulsive blanket according to the invention when the blank is in a relaxed state.
Figure 6B:
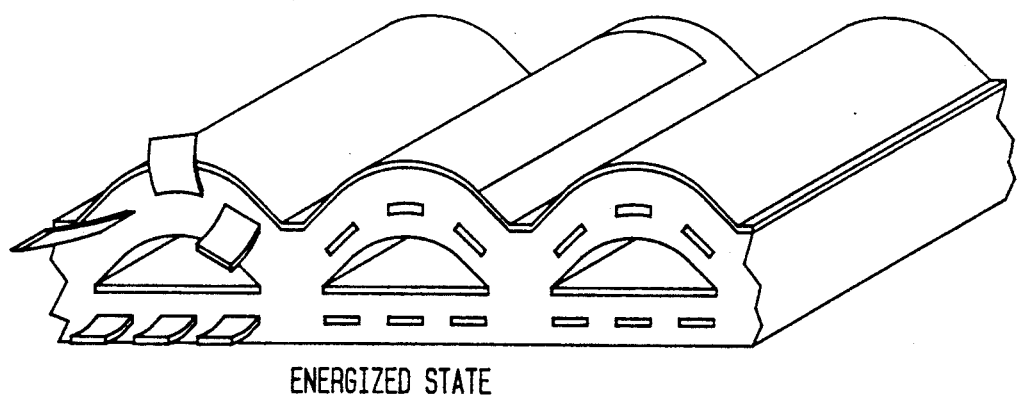
FIG. 6b depicts the blanket shown in FIG. 6a in an energized state.

FIGS. 6a and 6b depict a sensor system integrated with a blanket according to this invention. A sensor is embedded in the elastomer of a blanket that is attached to a surface. The elastomeric blanket is also embedded with flexible conducting ribbons. The expulsive blanket uses pulses of electricity to pulverize ice accumulations ranging from mere frost to one inch glaze in less than a millisecond. When triggered, as shown in FIG. 6b, a large direct current is released from a power supply and flows through opposite sides of the conducting ribbons. This creates an electromagnetic field that forces the adjacent conductors violently apart, causing the slits to distend and repel the ice from the blanket surface. A single blanket (non-segmented) to cover the entire leading edge of a wing is preferable.

Figure 7:
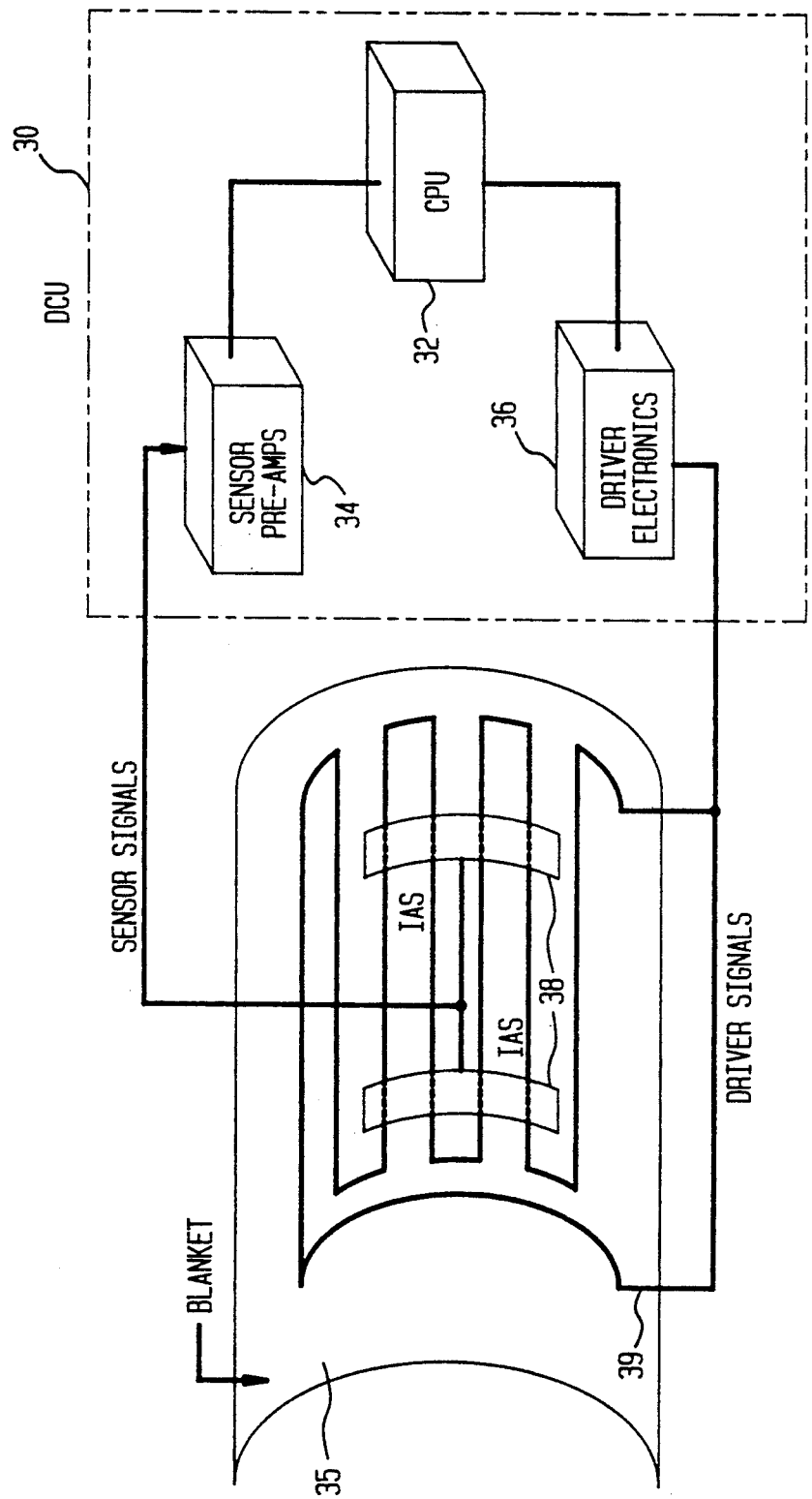
FIG. 7 depicts a block diagram for the embodiment of FIGS. 6a and 6b.

A system block diagram of the integrated blanket/sensor system is shown in FIG. 7. A De-icing Control Unit (DCU) 30 comprises a microprocessor central processing unit (CPU) 32, sensor preamps 34 for the Ice Accretion Sensors (IAS) 38, and driver electronics 36 for the conducting ribbons that act as De-Icing Actuators (DIA) 39. In essence, it is a closed-loop control system that senses and removes ice accretion on a vibrating surface. The controller pulses the blanket 35 at a low voltage level (typically approximately 100 V) from a capacitor to excite the dominant structural modal frequencies. The sensor output signal is proportional the surface deformation, which is a function of the surface stiffness, damping, the amount and type of ice buildup, and the ice distribution. Once a critical ice thickness is detected, an increased voltage level is used to expel the ice.

Figure 8:
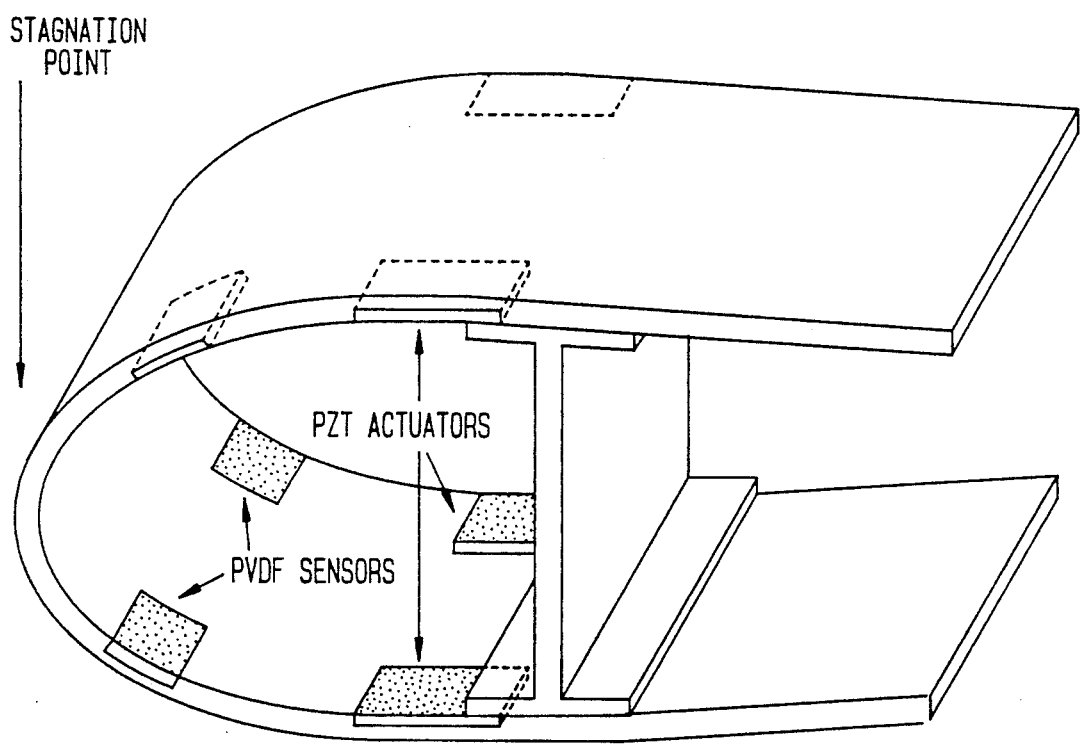
FIG. 8 depicts another preferred embodiment with PVDF sensors and Lead Zirconate-Titanate (PZT) actuators embedded in an airfoil leading edge skin.
Figure 9:
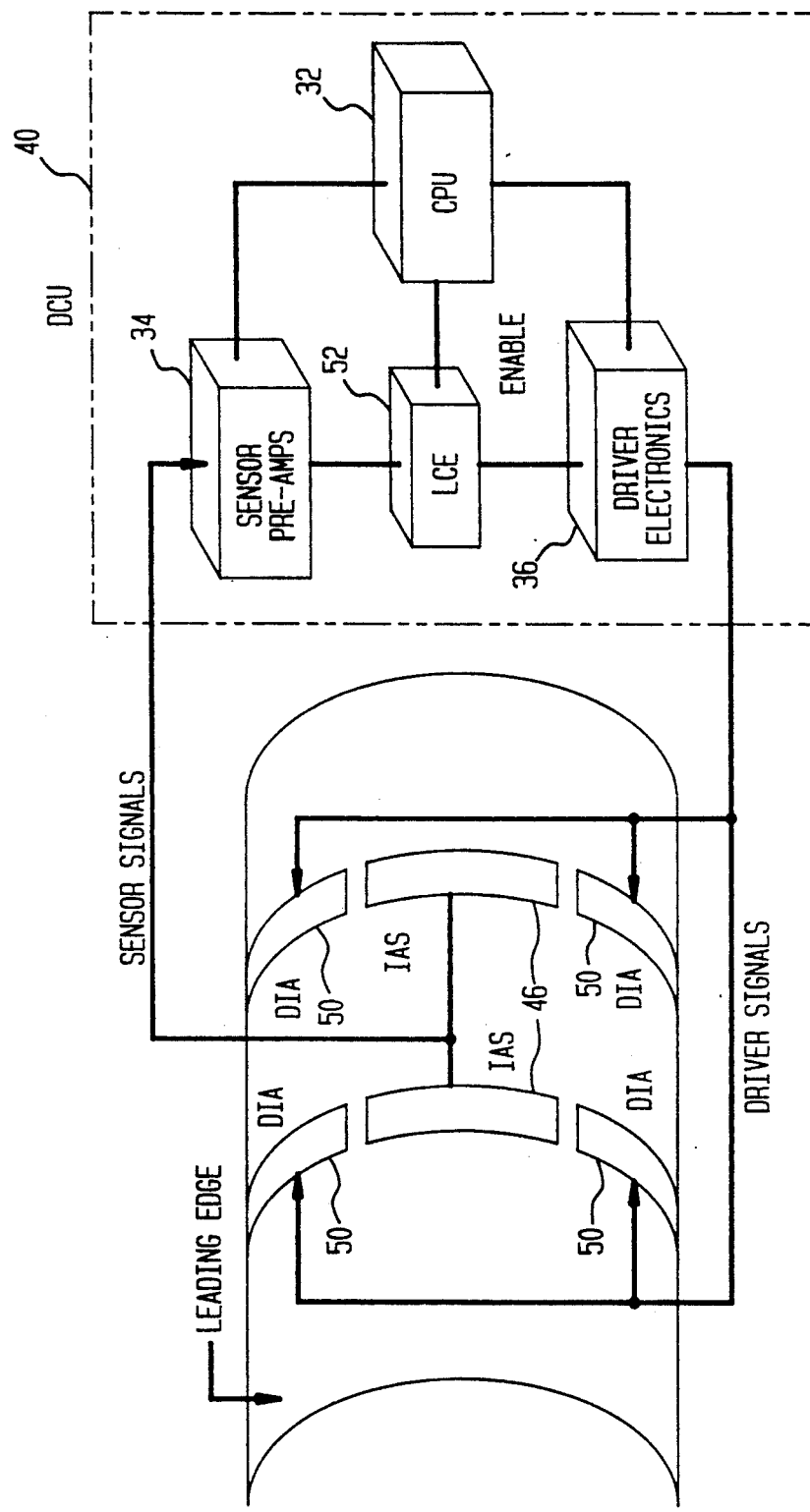
FIG. 9 depicts a block diagram of the embodiment of FIG. 8.
Figure 10A:
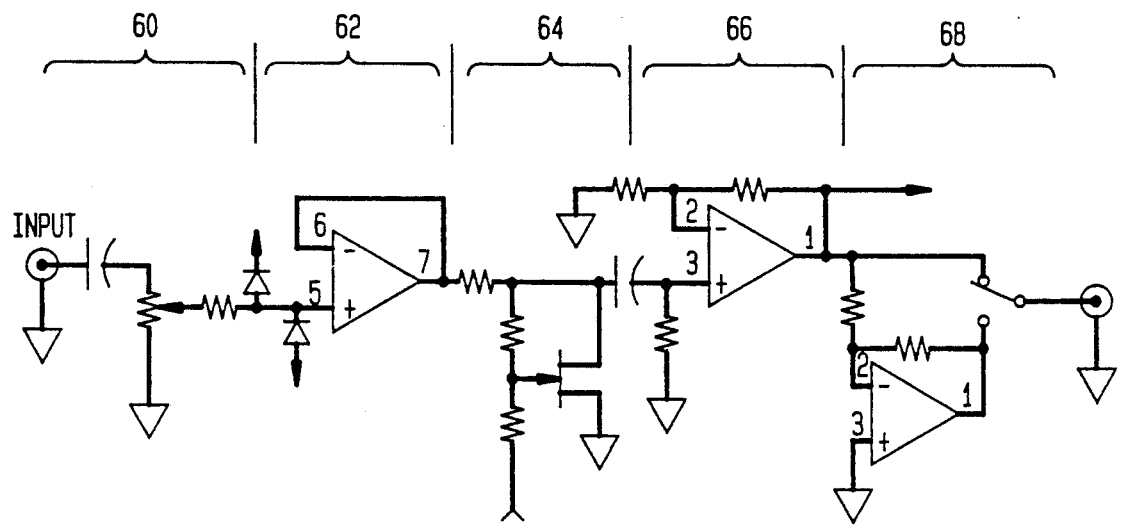
FIG. 10 is a circuit diagram of the Limit Cycle Electronics (LCE) shown in FIG. 9.
Figure 10B:
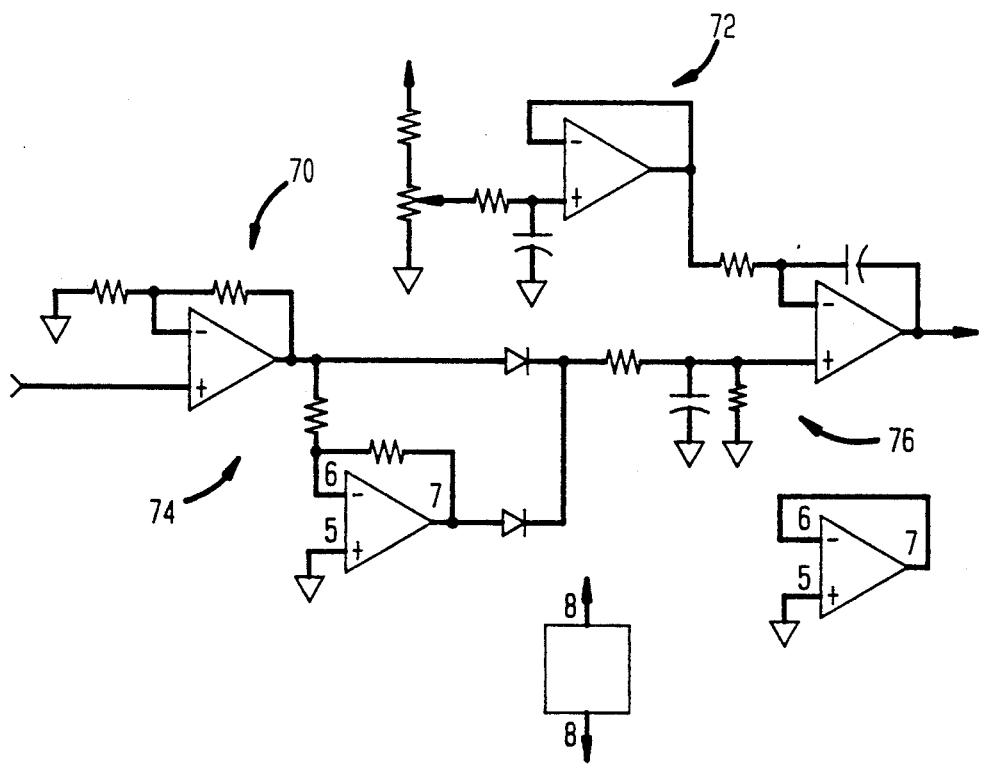

Yet another preferred embodiment combines the ice detection system of the present invention with Lead Zirconate-Titanate (PZT) actuators to effect ice removal by imparting vibrations to the surface. FIG. 8 depicts such a system installed in an aircraft wing with the PVDF sensors and PZT actuators embedded in an airfoil leading edge skin. FIG. 9 is a block diagram of such a system. A De-icing Control Unit (DCU) 40 comprises a microprocessor (CPU) 32, sensor preamps 34 for the Ice Accretion Sensors (IAS) 46, driver electronics 36 for the PZT crystals that act as De-Icing Actuators (DIA) 50, and Limit Cycle Electronics (LCE) 52 means for providing gain control, phase compensation, and filtering of signals generated by the sensors. An LCE circuit diagram is shown in FIG. 10. The LCE circuit comprises input protection means 60, input buffer means 62, attenuator means 64, output amplifier means 66, output inverter means 68, rectifier amplifier means 70, buffer means 72, rectifier inverter means 74 and integrator means 76.

Figure 11:
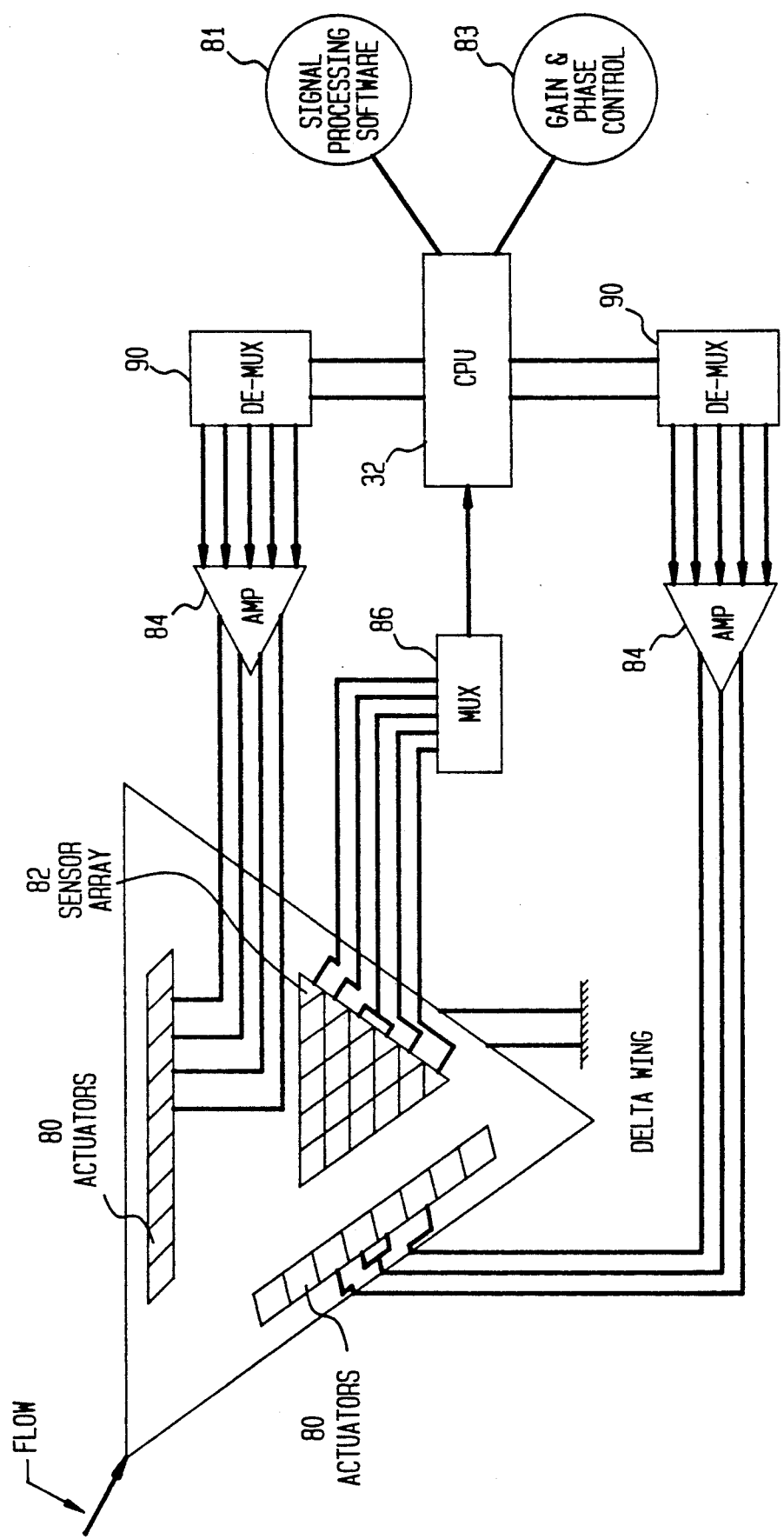
FIG. 11 depicts another embodiment according to the present invention.
Figure 13A:
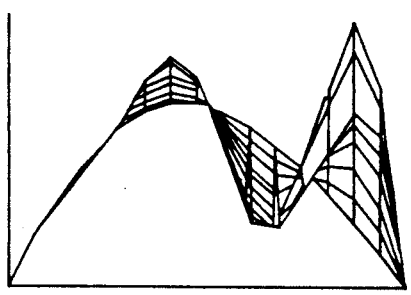
FIGS. 13a–13b depict the mode shape plots for Mode #2 without ice accretion.
Figure 13B:
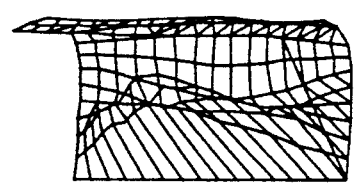
Figure 14A:
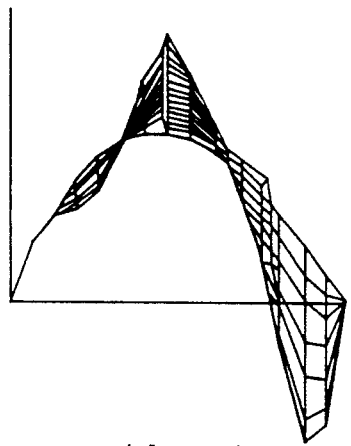
FIGS. 14a and 14b depict the mode shape plot for Mode #2 with ¼ inch ice accretion.
Figure 14B:
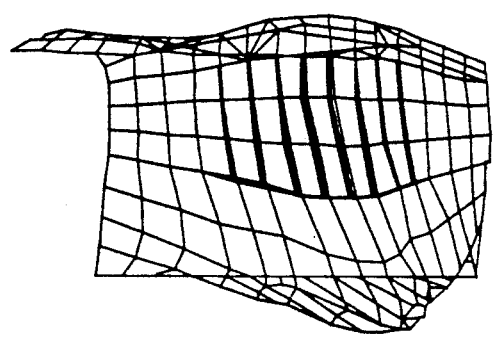
Figure 15A:
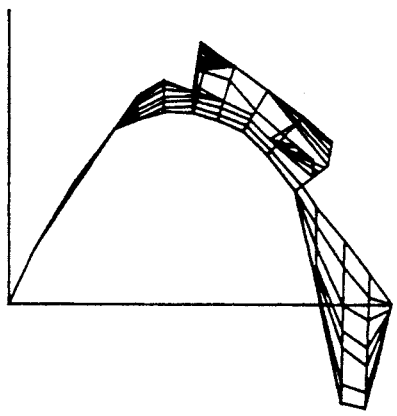
FIG. 15a and 15b depict the mode shape plot for Mode #2 with 1 inch ice accretion.
Figure 15B:
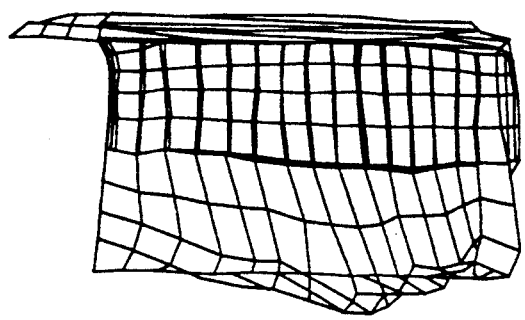
Figure 17A:
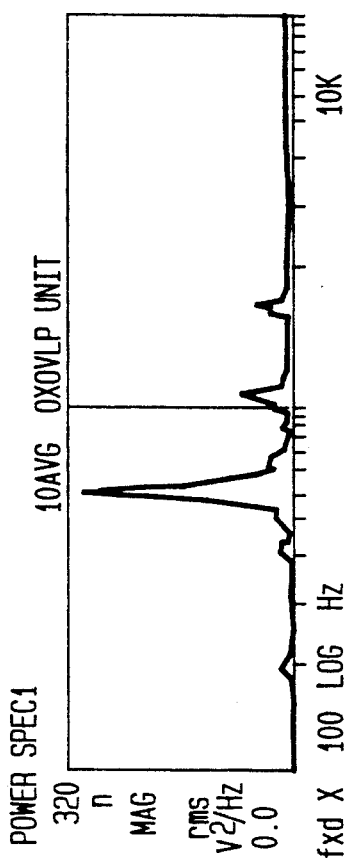
FIGS. 17a and 17b depict the frequency spectrum of vibration of the leading edge with ¼ inch ice accretion.
Figure 17B:
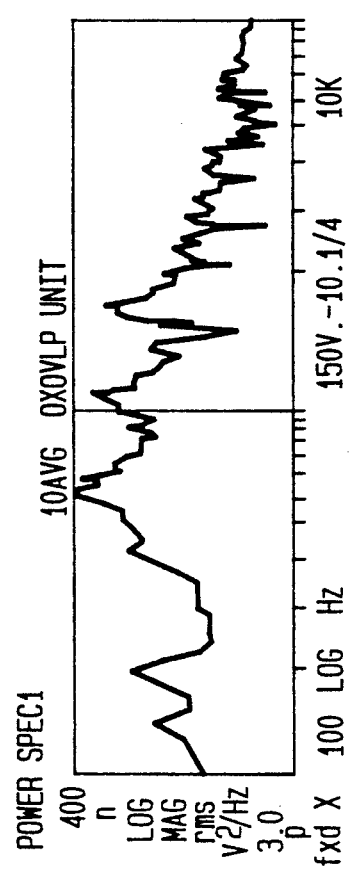
Figure 16A:
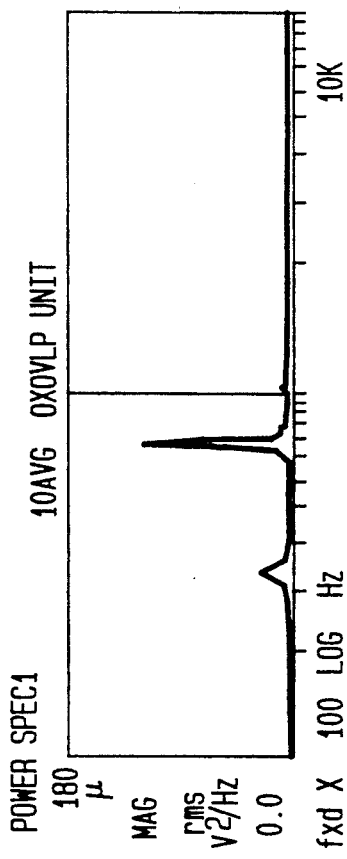
FIGS. 16a and 16b depict the frequency spectrum of vibration of the leading edge without ice accretion.
Figure 16B:
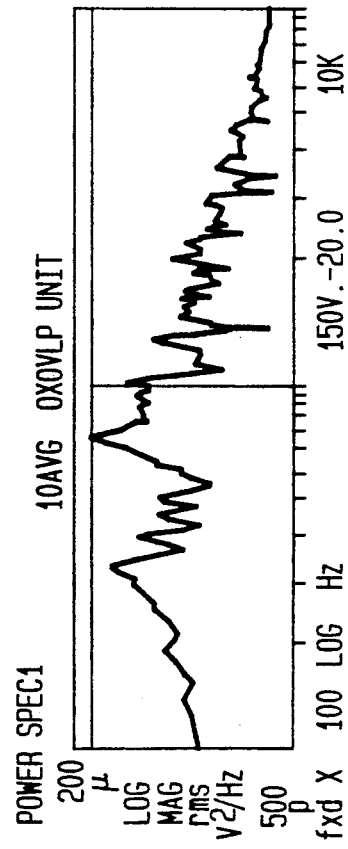

FIG. 11 illustrates another embodiment of the present invention comprising actuator means 80, sensor array means 82, amplifier means 84, multiplexor means 86, demultiplexor means 90 and microprocessor means 32 having gain and phase control 83 and signal processing software 81.

FIG. 12a depicts the embodiment of the invention illustrated in FIG. 11, installed on an aircraft wing.

FIG. 12b is a cross-sectional view of FIG. 12a wherein the system is installed in a blanket or boot and placed over the aircraft wing.

TABLE 1

| Item | Material | Model Parameters | | | |
|---|---|---|---|---|---|
| | | Young's Modulus | Poisson's Ratio | Density lb/in$^3$ | Thickness inch |
| Leading edge | Aluminum | 10.5E6 | 0.3 | 0.1 | 0.032 |
| Doubler | Aluminum | 10.5E6 | 0.3 | 0.1 | 0.05 |
| Coil mounting | Figerglass | 7.0E6 | 0.26 | 0.04 | 0.15–0.2 |
| Bonding Agent | Rubber | 3.0E3 | 0.35 | 0.075 | 0.03 |
| Ice | Ice | 1.0E6 | 0.3 | 0.036 | ⅛–1 |

TABLE 2

| | Modal Frequencies Versus Ice Thickness | | | |
|---|---|---|---|---|
| Ice Thickness | Mode #1 (Hz) | Mode #2 (Hz) | Mode #3 (Hz) | Mode #4 (Hz) |
| No ice | 218.79 | 333.60 | 478.95 | 528.85 |
| 0.125" | 245.03 | 370.71 | 519.12 | 552.74 |
| 0.25" | 256.30 | 385.72 | 526.35 | 568.81 |
| 0.5" | 279.67 | 419.78 | 525.91 | 587.02 |
| 1.0" | 297.78 | 486.42 | 528.54 | 593.58 |

We claim:

1. A distributed system for detecting ice on a surface capable of vibrating in at least one vibrational mode, comprising:
    piezoelectric sensor array means located a distance from a formation of said ice, said array means responsive to strain caused by vibration of said surface for generating sensor signals proportional to said strain; and
    processor means for processing said sensor signals to determine the resonant characteristics of said surface so as to determine the presence of ice on said surface.

2. A system as claimed in claim 1 wherein the sensor array means comprises a single piece of piezoelectric film.

3. A system as claimed in claim 2 wherein the piezoelectric film is polyvinylidene fluoride (PVDF) film.

4. A system as claimed in claim 1 wherein the sensor array means comprises a plurality of pieces of piezoelectric film.

5. A system as claimed in claim 4 wherein the piezoelectric film is polyvinylidene fluoride (PVDF) film.

6. A distributed system for detecting ice on a surface capable of vibrating in at least one vibration mode, comprising:
    a) piezoelectric sensor array means for sensing the vibration characteristics of such surface; and
    b) processor means for processing signals generated by the sensor array means to determine the presence of ice on such surface, said processor means including:
        i) a microprocessor with the capability of performing Fast Fourier Transforms (FFTs) on the signals generated by the sensor array means.

7. A system as claimed in claim 6 wherein the microprocessor means further comprises the capability of processing the FFTs of a first set of at least one sensor array means and of a second set of at least one sensor array means and dividing the FFT of the first set by the FFT of the second set to obtain a transfer function, wherein the first set is disposed more upstream to air flow than the second set.

8. A distributed system for detecting ice on a surface capable of vibration in at least one vibrational mode, comprising:
   a) piezoelectric sensor array means for sensing the vibration characteristics of such surface; and
   b) processor means for performing a spectral analysis on the signals generated by the sensor array means to determine the presence of ice on such surface.

9. A system as claimed in claim 8 further comprising:
   c) environmental sensing means for sensing one or more environmental parameters and for generating signals representing such parameters, wherein the processor means comprises the capability of processing the signals generated by the environmental sensing means.

10. A system as claimed in claim 9 wherein the environmental parameters are selected from the group consisting of temperature, humidity, and relative humidity.

11. A distributed system for detecting ice on a surface capable of vibrating in at least one vibration mode, comprising:
   a) piezoelectric sensor array means for sensing the vibration characteristics of such surface;
   b) processor means for processing signals generated by the sensor array means to determine the presence of ice on such surface, said processor means including:
      i) a microprocessor with the capability of performing Fast Fourier Transforms (FFTs) on the signals generated by the sensor array means; and
      ii) storage means for storing information on the vibration characteristics of the surface as a function of ice loading and on one or more additional environmental parameters; and
   c) means for comparing the stored information on the vibration characteristics of the surface, and the Fast Fourier Transforms of the signals generated by the sensor array means so as to determine the thickness and density of ice on the surface.

12. A distributed system for detecting ice on a surface capable of vibrating in at least one vibrational mode, comprising:
   piezoelectric sensor array means responsive to strain caused by deformation of said surface for generating sensor signals proportional to said strain; and
   processor means for processing said sensor signals to determine the resonant characteristics of said surface so as to determine the presence of ice on said surface.

* * * * *

UNITED STATES PATENT AND TRADEMARK OFFICE
CERTIFICATE OF CORRECTION

PATENT NO. : 5,206,806

DATED : March 9, 1993

INVENTOR(S) : Joseph J. Gerardi, Gail A. Hickman

It is certified that error appears in the above-identified patent and that said Letters Patent is hereby corrected as shown below:

Title Page, inventor data incorrect.

Should read -- Joseph J. Gerardi, 81 Crystal Dr., Dryden, N.Y. 13053; Gail A. Hickman, 81 Crystal Dr., Dryden, N.Y. 13053 --

Signed and Sealed this

Nineteenth Day of April, 1994

Attest:

BRUCE LEHMAN

*Attesting Officer*     *Commissioner of Patents and Trademarks*